Jan. 9, 1934.  G. W. FORD  1,943,172
PRODUCTION OF DISTORTED PHOTOGRAPHS
Filed July 17, 1933  2 Sheets-Sheet 1

INVENTOR
George William Ford,
By Warren Dunham Foster,
atty.

Jan. 9, 1934.   G. W. FORD   1,943,172
PRODUCTION OF DISTORTED PHOTOGRAPHS
Filed July 17, 1933   2 Sheets-Sheet 2

INVENTOR.
GEORGE WILLIAM FORD
BY Warren D. Foster
ATTORNEY.

Patented Jan. 9, 1934

1,943,172

UNITED STATES PATENT OFFICE 1,943,172

PRODUCTION OF DISTORTED PHOTOGRAPHS

George William Ford, Patcham, Brighton, England

Application July 17, 1933, Serial No. 680,839, and in Great Britain July 15, 1932

17 Claims. (Cl. 88—16)

This invention relates to the production of distorted photographs, both still and motion.

It is well known that a photograph, either a still photograph or a cinematograph film, in which one of the dimensions has been distorted, produces a humorous effect. Hitherto, however, in distorted photographs, the entire photograph, including both the images of persons and the scenery or background associated therewith, has been caused to exhibit the distorted appearance.

The object of this invention is to produce distorted photographs either still or motion, in which only the persons appear distorted while the scenery or background appears undistorted.

For this purpose, in the present invention, while the entire scene to be photographed is photographed through a distorting lens system, the scenery or background thereof is constructed or projected on a distorted scale such that in the photographed image thereof the distortion is corrected whereas images of associated normal persons are distorted.

The invention therefore consists in conjointly photographing through a distorting lens system a person and a background in a distorted scale such that the distortion thereof is corrected in the photographed image. The background, for example, consists of or depicts objects on a distorted scale, for instance of exaggerated height relatively to the normal height of such objects. In the photographed image of the background and person, the distortion, for instance exaggerated height, of the objects becomes corrected so that the objects appear normal, whereas the person appears distorted for instance dwarfed relatively to the objects.

For example a lens system can be used which halves the vertical dimension. In such case the scenery and background are constructed or projected of twice the normal height. Photographs of actors photographed by such lens system associated with such scenery and background, will show the actors dwarfed in normal surroundings.

All the humorous effects such as the change of dimension of a limb in moving from the vertical to the horizontal position are retained, with the added illusion that these effects are taking place amongst normal surroundings.

The distortion may obviously be in the horizontal instead of the vertical dimension.

Any well-known distorting lens system can be employed such as those embodying a cylindrical lens or a suitable prism system.

The invention is illustrated by way of example on the accompanying drawings, in which:—

Figure 3:
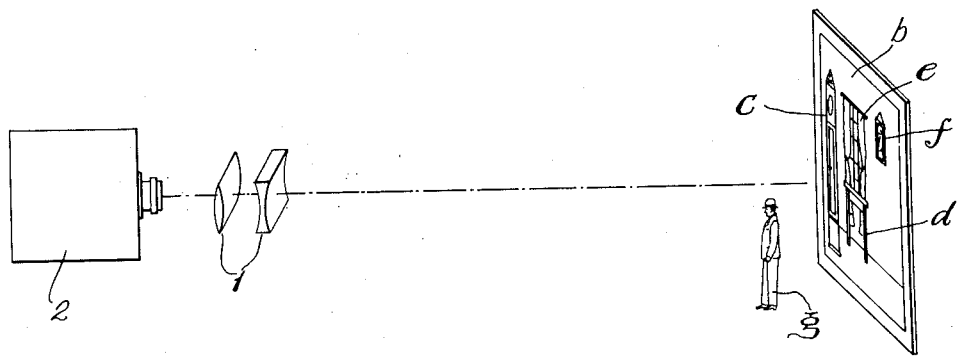

Figure 3 conventionally and diagrammatically represents my method as applied to the photographing of a distorted background against which a normal figure appears.

Figure 4:
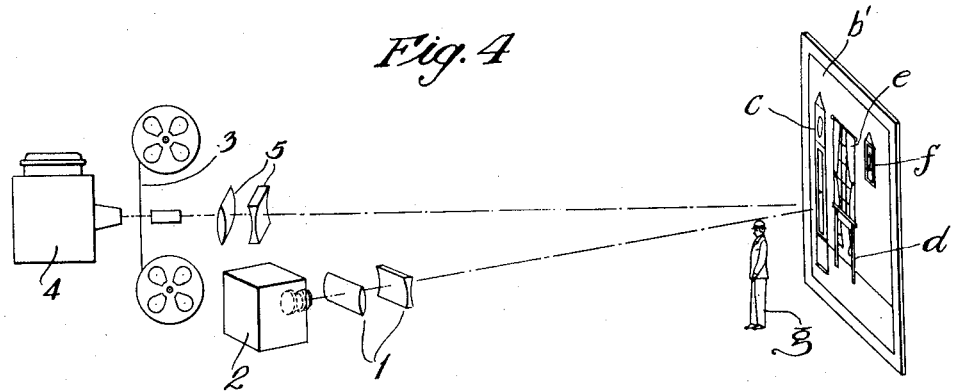

Figure 4 conventionally and diagrammatically represents my method as applied to the projecting of a normal film through a distorting lens system to serve as a distorted background against which a normal figure appears and the photographing of that background and figure through a distorting lens system which distorts the figure and corrects the distortion of the projected background.

Figure 1:
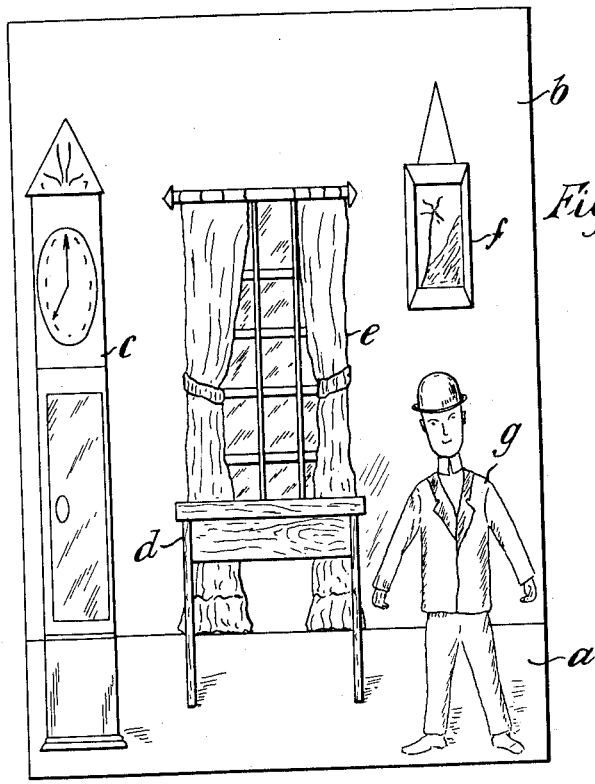
Figure 1 is a view of a background composed of objects of abnormal height alongside which a human figure of normal height is standing.

$a$, Fig. 1, is a floor with a wall $b$ on and in front of which are arranged objects, such as a grandfather clock $c$, table $d$, window $e$ and picture $f$, the vertical dimensions of which are considerably exaggerated relatively to the corresponding vertical dimensions of the same normal objects. The whole constitutes the background for the photograph.

$g$ represents a human figure of normal height standing on the floor $a$ alongside the vertically exaggerated objects $c, d, e, f$.

Figure 2:
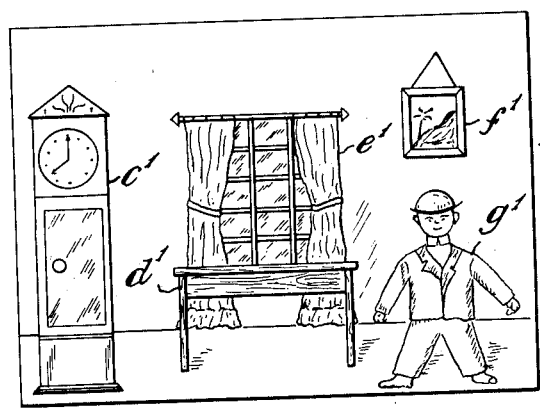
Figure 2 represents a photograph of the view shown in Fig. 1 photographed with the aid of a distorting lens system which reduces the height of the background to the normal relatively to the width thereof.

The background of objects of exaggerated height $c, d, e, f$ and the human figure $g$ are conjointly photographed with the aid of a distorting lens system, well-known in the art, represented conventionally as 1, through a camera 2, which gives a photographic image in which the exaggeration of the vertical dimensions of the objects of the background is corrected by the vertical dimension being reduced to normal relatively to the horizontal dimension of the image. This is shown in Fig. 2 wherein the grandfather clock $c^1$, table $d^1$, window $e^1$ and picture $f^1$ appear of normal height. However, in producing an image, Fig. 2, in which the exaggerated vertical dimension of the background is corrected, the distorting lens system necessarily produces a dwarfed image $g^1$, Fig. 2, of the normal human figure $g$, Fig. 1.

Obviously instead of the background being composed of actual objects of exaggerated height these objects of exaggerated height may merely be depicted on the back cloth $b$, as diagrammatically illustrated in Fig. 3. It is also conceivable that they may be optically projected thereon from a film 3 projected by a projector 4 through a distorting lens system 5 upon a screen b'; as diagrammatically shown in Fig. 4.

I claim:

1. The method of producing a composite and distorted photograph which consists of conjointly forming a single image of normal and distorted objects through a distorting optical medium of such characteristics that the distortion of said distorted object is corrected and said normal object appears distorted.

2. The method of producing a composite and distorted photograph which consists in making one exposure of a light sensitive medium to a scene in which one portion is of normal proportions and another portion of abnormal proportions, said exposure being made through a distorting lens system of such characteristics that it corrects the image of said portion which is abnormal so that it appears normal in the resulting photograph, and distorts the image of said portion of normal proportions so that in the resulting photograph it appears abnormal.

3. The method of producing a composite and distorted photograph which consists of creating a distorted background, placing a normal object before said background, and simultaneously photographing said object and said background through a distorting optical medium of such characteristics that the distortion of said background is corrected and the image of said object distorted whereby in the resulting photograph said object appears distorted against a normal background.

4. The method of producing a composite and distorted photograph which consists of creating a distorted setting, having a person act in said setting, and simultaneously photographing said person and said setting through a distorting optical medium of such characteristics that the distortion of said setting is corrected and the image of said person distorted whereby in the resulting photograph said person appears distorted against a normal background.

5. The method of producing a composite and distorted photograph which consists of projecting a distorted background upon an image receiving surface, placing a normal object before said background, and photographing said object and said background through a distorting optical medium of such characteristics that the distortion of said background is corrected and the image of said object distorted whereby in the resulting photograph said object appears distorted against a normal background.

6. The method of producing composite and distorted motion pictures which consists of projecting a distorted background upon an image receiving surface, having a person act before said background, and photographing said person and background through a distorting optical medium of such characteristics that the distortion of said background is corrected and the image of said person distorted whereby in the resulting photograph said person appears distorted against a normal background.

7. A method of producing distorted photographs, consisting in conjointly photographing through a distorting lens system a person and a distorted background with which he appears, the distorting power of the lens system being such that the distortion of the background is corrected in the photographed image while the figure of the person appearing in said image is distorted.

8. A method of producing distorted photographs, consisting in conjointly photographing through a distorting lens system a person and objects, said objects being on a distorted scale, the distorting power of said lens system being such that the distortion of said objects is corrected in the photographed image while the figure of the person appearing in said image is distorted.

9. A method of producing distorted photographs consisting in simultaneously photographing through a distorting lens system a person and a distorted background in connection with which he appears, the distorting power of the lens system being such that the distortion of the background is corrected in the photographic image while the figure of the person appears in said image as distorted.

10. A method of producing distorted photographs consisting in simultaneously photographing with a distorting lens system a person and objects, said objects being on a distorted scale, and the distorting power of said lens being such that the distortion of said objects is corrected in the photographic image while the figure of the person appears in said image as distorted.

11. A method of producing distorted photographs, consisting in conjointly photographing through a distorting lens system a person and a background composed of objects one dimension of which is on a distorted scale, the distorting power of said lens system being such that the distortion of said objects is corrected in the photographed image while the figure of the person appearing in said image is distorted.

12. A method of producing distorted photographs, consisting in conjointly photographing through a distorting lens system a person and a background in conjunction with which he appears, said background being composed of objects the vertical dimension of which is on a distorted scale and the distorting power of said lens system being such that the distortion of said objects is corrected in the photographed image while the figure of said person appears in said image as distorted.

13. A method of producing distorted photographs, consisting in conjointly photographing through a distorting lens system a person and a background in conjunction with which he appears, said background being composed of objects the vertical dimension of which is on an exaggerated scale, the distorting power of the lens system being such that the distortion of said objects is corrected in the photographed image while the figure of said person appears in said image as distorted.

14. A method of producing distorted photographs, consisting in conjointly photographing through a distorting lens system a person and a background depicting objects on a distorted scale, the distorting power of said lens system being such that the distortion of said objects is corrected in the photographed image while the figure of said person appears in said image as distorted.

15. A method of producing distorted photographs, consisting in conjointly photographing through a distorting lens system a person and a background depicting objects one dimension of which is on a distorted scale, the distorting power of said lens system being such that the distortion of said objects is corrected in the photographed image while the figure of said person appears in said image as distorted.

16. A method of producing distorted photographs, consisting in conjointly photographing through a distorting lens system a person and a background depicting objects the vertical dimension of which is on a distorted scale, the distorting power of said lens system being such that the distortion of said objects is corrected in the photographed image while the figure of said person appears in said image as distorted.

17. A method of producing distorted photographs, consisting in conjointly photographing through a distorting lens system a person and a background depicting objects the vertical dimension of which is on an exaggerated scale, the distorting power of said lens system being such that the distortion of said objects is corrected in the photographed image while the figure of said person appears in said image as distorted.

GEORGE WILLIAM FORD.